United States Patent [19]

Dabby et al.

[11] 4,184,948

[45] Jan. 22, 1980

[54] WATER SOFTENING METHOD USING THERMALLY REGENERABLE ION EXCHANGE RESIN

[75] Inventors: Sabah S. Dabby, Morrisville, Pa.; Emmanuel J. Zaganiaris, Juan-les-Pins, France

[73] Assignee: Rohm and Haas Company, Philadelphia, Pa.

[21] Appl. No.: 802,142

[22] Filed: May 31, 1977

[51] Int. Cl.$^2$ ................................................ C02B 1/40
[52] U.S. Cl. ...................................... 210/25; 210/32; 210/34
[58] Field of Search .................... 210/38 R, 24, 32, 35, 210/38 A, 37 R, 34, 25, 30 R; 260/2.1 R, 2.1 E, 2.2 R; 521/26

[56] References Cited

U.S. PATENT DOCUMENTS

| | | | |
|---|---|---|---|
| 2,891,007 | 6/1959 | Caskey et al. | 210/35 |
| 3,248,278 | 4/1966 | Wilson | 210/32 |
| 3,342,730 | 9/1967 | Mihara et al. | 210/32 |
| 3,382,169 | 5/1968 | Thompson | 210/32 |
| 3,425,937 | 2/1969 | Weiss et al. | 210/32 |
| 3,537,989 | 11/1970 | Crits | 210/32 |
| 3,991,017 | 11/1976 | Barrett et al. | 260/2.1 R |
| 4,087,357 | 5/1978 | Barrett et al. | 10/32 |

OTHER PUBLICATIONS

4th International Symposium on Fresh Water from the Sea-European Fed. of Chem. Eng., Sep. 1973, pp. 13-23 (Battuerd et al.)
Bolto et al, Advances in Thermally Regenerated Ion Exchange.

*Primary Examiner*—Robert H. Spitzer
*Assistant Examiner*—Ivars Cintins
*Attorney, Agent, or Firm*—Louis F. Kline, Jr.; John E. Taylor, III

[57] ABSTRACT

Certain thermally regenerable ion exchange resins are operated in a novel process to soften and demineralize aqueous solutions. The process includes countercurrent thermal regeneration of the resin.

10 Claims, No Drawings

WATER SOFTENING METHOD USING THERMALLY REGENERABLE ION EXCHANGE RESIN

This invention relates to the removal of dissolved salts from aqueous solutions containing the same. In particular, it relates to the removal of these dissolved salts, and especially the divalent and monovalent cations of these salts using thermally regenerable ion-exchange resins, and to the countercurrent thermal regeneration of such resins subsequent to ion removal.

Thermally regenerable ion exchange resins are those resins containing both acid and base ion exchange functionality, in which the process of removing cations and anions from a fluid may be reversed by heating the fluid, so that ions removed from the cooler fluid are returned to the warmer fluid. This is a well-known process with the significant advantage that expensive regenerant reagents may be replaced by hot treated fluid, or any other hot aqueous fluid with a relatively low dissolved salts content.

Thermally regenerable ion exchange resins have been used successfully to remove divalent, or hardness, cations from water, or to remove monovalent cations from water. This known process is most effective when the concentration of either divalent or monovalent cations is at least 75 percent of the total cation concentration. When these resins are used to treat water containing approximately equal amounts of both divalent and monovalent cations, the product yield of treated water is markedly reduced, with breakthrough of monovalent cations into the effluent occurring much earlier than where water containing mostly monovalent cations is treated, and well before the divalent cation capacity is exhausted.

Attempts to overcome this problem have usually involved the use of two ion exchange resin beds, one to remove the divalent cations, and the second to remove the monovalent cations. Separate beds were required, generally containing different resins, because the pH requirement of each given resin for monovalent cation removal was different from its pH requirement for divalent cation removal. As a result, the resin for each bed was selected to remove either divalent or monovalent cations at the pH of the influent water. Alternatively, separate beds of the same resin could be used, with acid or base being metered into the water between beds to adjust the pH. Both approaches have drawbacks in terms of equipment complexity and economics. An attempt to use a single resin bed and operate it with a pH gradient across the bed was reported as unsuccessful. The work described above has been reported in the paper, "Advances in Thermally Regenerated Ion Exchange," B. A. Bolto, et al., presented at the conference on The Theory and Practice of Ion Exchange (1976), and by H. A. J. Battaerd, et al, "Proceedings of the Fourth International Symposium on Fresh Water From the Sea", pp. 12-23 (1973).

The removal of sulfate anions from water using strongly basic anion exchange resins is well known. The capacity of thermally regenerable resins for cation removal is significantly reduced when sulfate anions occur with calcium cations, because both calcium and sulfate ions are removed by the resin, and are returned together to the regenerant fluid. Although calcium sulfate is slightly soluble at the lower temperatures of the loading cycle, at the higher temperatures of regeneration it is less soluble, and precipitates within the bed. For this reason, anion exchange resins are often used to pre-treat waters prior to hardness treatment. These pre-treatment beds are regenerated separately.

While anions are removed by the base functionality of the thermally regenerable resins, and the useful anion exchange capacity of these resins, in the processes discussed below, changes from predominantly the hydroxyl ion form in the fully regenerated resin to predominantly the chloride form, with smaller amounts of those other anions found in the input fluid, these processes are primarily concerned with, and will be discussed largely in terms of, cation removal.

It has been discovered that a bed of a single thermally regenerable ion exchange resin may be operated in such a way that two zones establish themselves within the bed. The first zone acts to remove predominantly the divalent cations from a treated fluid while removing only minor amounts of monovalent cations, and the second zone acts to remove predominantly the monovalent cations from the fluid.

This process is suitable for removing both divalent and monovalent cations from waters containing these cations in mole ratios of between about 1:3 and about 3:1, and containing less than about 20 millimoles of total dissolved salts per liter of water; those waters having divalent to monovalent cation ratios and total dissolved salts levels outside these limits can usually be treated successfully using conventional, single-zone resin beds. At higher total dissolved salts levels, conventional cation exchange resins are normally more effective than the resins of this invention. A highly significant advantage of this dual-zone process is that it increases the fraction of both divalent and monovalent cation exchange capacity which is exhausted before breakthrough of monovalent cations into the effluent occurs; this results in an increased thermal efficiency, in units of regenerant heat per unit of cations removed, for operation of the resin.

In connection with this dual-zone operation mode, it has been discovered that both zones of the resin bed may be regenerated by heating an aqueous fluid which is low in dissolved salts (e.g., water, deionized water, treated product fluid) and passing it through the entire bed in a countercurrent direction, that is, in a direction opposite that in which the fluid flows during cation removal. During this countercurrent thermal regeneration monovalent cations fixed upon the resin of the second zone are exchanged for hydrogen cations in the hot regenerant fluid and the divalent cations fixed upon the resin of the first zone are exchanged for monovalent cations displaced from the second zone and hydrogen cations in the hot regenerant.

It has further been discovered that a strongly basic anion exchange resin may be selected as the pre-treatment resin, this resin serving both to adjust the pH of natural alkaline waters to a value suitable for treatment by the thermally regenerable resin operating in the dual-zone mode, and to remove sulfate anions from water to be treated, and that this pre-treatment resin may be regenerated by the $Cl^-$ enriched spent regenerant from the dual-zone resin bed. As a result of this discovery, the entire fluid treatment system comprising the pre-treatment resin bed and the dual-zone, thermally regenerable resin bed may be regenerated by passing a heated aqueous fluid low in dissolved solids, such as water or a portion of the treated fluid, through these resin beds in a countercurrent direction.

In the terminology used herein, the term "monovalent cations" excludes the $H^+$ cation, which is identified separately and specifically as "$H^+$" or "hydrogen" cation. The term "useful cation exchange capacity" refers to that portion of the functional groups present in the ion exchange resin at which cations are actually exchanged during the loading and regeneration cycles. The useful capacity is always less than the theoretical capacity based on the total number of functional groups in the resin, and can be well below 50 percent of the theoretical capacity. The ionic form of the useful capacity may be different from that of the remaining functional groups.

In the dual zone operation of the thermally regenerable ion exchange resin, the useful cation exchange capacity of the first zone—that zone which first contacts the fluid being treated—is largely in the $Na^+$ cation form, and the useful capacity of the second zone is largely in the $H^+$ cation form. Divalent cations from the fluid are exchanged for the sodium ions on the resin sites in the first zone, and these sodium ions, plus the monovalent cations already in the fluid, are exchanged for hydrogen ions on the resin sites in the second zone. This contrasts with the behavior observed when a single zone is employed: divalent cations, for which the resin has a greater affinity than for sodium ions, occupy the acidic functional sites responsible for the useable cation exchange capacity. The portion of the resin bed occupied by these cations is too large to be regenerated by a reasonable volume of regenerant, so at least some of them remain after regeneration. Each subsequent regeneration leaves increasingly greater numbers of divalent cations occupying the useful cation exchange sites, with the result that each subsequent loading has an increasingly earlier breakthrough of the monovalent cation.

The size of the zones is established by the loading and regeneration cycle; this cycle, in turn, must be selected experimentally such that the resulting zones in the resin bed can accommodate the concentration of cations, and the ratio of divalent to monovalent cations, in the specific water to be treated. As the first of a two-part determination of zone sizes and load-regenerate cycle, the softening capacity of the resin for the water to be treated is determined by passing it through a resin bed of known volume, and monitoring the divalent cation leakage of the effluent. The number of bed volumes of water which that resin can soften to the desired level is thus determined; the presence of monovalent cations has little effect on the softening, since the resin has a higher affinity for divalent than for monovalent cations.

The second part of the determination is determining the number of bed volumes of water from which the regenerated resin can remove monovalent cations to the desired level, where only relatively low levels—less than 25 percent of the total cations—of divalent cations are present. This may be done using the softened water of the previous determination or a synthetic water containing about the same amount of monovalent and divalent cations as the effluent from the softening bed. The resin is regenerated with hot water prior to this determination, so that the useful cation capacity of the resin is in the $H^+$ form. The experimental determination of the loading and regeneration cycle is illustrated in Example 1 below.

Once the volumes for the loading and regeneration cycles have been selected, the process of the present invention may be used to treat waters containing approximately the same levels of divalent and monovalent cations as those for which the cycle volumes were selected. Operation of the dual-zone process involves the following steps:

(a) passing the selected volume of water to be treated, at a relatively low temperature, into an ion exchange resin bed containing a single, thermally regenerable ion exchange resin in two theoretical zones, a first, or softening, zone, and a second, demineralizing, or monovalent-cation-removal, zone, where divalent cations are removed from the water and are fixed onto the resin in the first zone, and monovalent cations are removed from the water and are fixed onto the resin in the second zone, (b) collecting the major portion of the effluent from the resin bed for further use as the product of the present process, (c) optionally collecting a final, minor portion of the effluent from the resin bed for use as the regenerant, (d) heating the regenerant, whether treated fluid or another aqueous fluid low in dissolved solids, to a relatively high temperature, and (e) passing the heated regenerant through the resin bed in a direction opposite that of the water during treatment, when the monovalent cations on the resin in the second zone are exchanged for $H^+$ cations from the hot regenerant, and divalent cations on the resin in the first zone are exchanged for monovalent cations, including $H^+$ cations, leaving the resin ready for re-use.

The resin, as normally obtained from commercial sources, is in the $Na^+$, $Cl^-$ form, and it is placed in the ion exchange column in this form. The resin is converted to the dual zone form, in which the useful cation exchange capacity of the first zone is largely in the $Na^+$ form and the useful capacity of the second zone is largely in the $H^+$ form, by operating the resin according to the process of this invention, using the loading and regeneration volumes selected as described herein. The first complete loading and regeneration cycle of a freshly regenerated resin establishes the resin in essentially the dual zone form, and subsequent cycles quickly establish the two zones in the particular relative sizes which they will maintain throughout the life of the resin, so long as the selected loading and regeneration cycles are maintained and the approximate concentration of divalent and monovalent cations in the feed fluid is unchanged.

It should be noted that the thermally regenerable resin bead may be operated in the dual zone made regardless of the physical arrangement of the resin into one or more columns. The two zones may be operated in a bed within a single column, or in more than one column. Further, if the resin is in more than one column, the zones need not occupy whole columns; as an example, if the resin occupies two equally sized columns, the softening zone may occupy two-thirds of the first column, and the monovalent cation removal zone may occupy the remainder of that column and all of the second.

While the process of this invention is operable with waters containing very low total dissolved salts levels, significant reductions in these levels being achieved with waters containing about 10 weight parts of dissolved salts, calculated as calcium chloride, per million weight parts of water, in preferred practice the process is applied to waters containing at least about 100 weight parts of dissolved salts as $CaCO_3$ per million weight parts of water, or about one millimole of dissolved salts per liter of water.

A range of temperatures may be employed for both the influent and the regenerant fluids in the process of this invention. Thermal regeneration will occur when a temperature differential of less than a degree or two exists between the influent and regenerant fluids, and the bed may be loaded with influent waters no warmer than necessary to prevent freezing, and regenerated, where pressurizable columns are used, at temperatures of about 150°–200° C. In practice, however, little additional regeneration is gained for the added heat above 100° C., and cooling of influent waters below their ambient temperature is economically impractical. In the preferred operation of this invention the minimum temperature differential between influent and regeneration fluids is about 40° C., the maximum influent water temperature is about 35° C., and the range of regenerant temperatures is between about 70° C. and about 98° C.

In some cases, notably where the divalent to monovalent cation ratio approaches 3:1, insufficient monovalent cations may be fixed by the second zone during the loading cycle, so that the first zone is not fully regenerated with monovalent cations during countercurrent regeneration. Should this situation occur, additional sodium chloride or other monovalent halide solution may be injected into the resin bed at the approximate interface of the first and second zones, to provide the necessary additional monovalent cations for complete regeneration of the first zone. This is a special case of the dual-zone operation.

The advantage of the process of this invention over known processes is apparent from an examination of the data from Examples 2 and 3, below; multi-cycle operation in the dual-zone mode achieves significantly greater efficiency, in terms of heat input for regeneration per milliequivalent of cation removed, than other operation modes, including co-current regeneration modes and countercurrent regeneration modes which use other than the optimum loading and regeneration cycles.

As discussed above, a pre-treatment resin is useful to remove sulfate anions which may foul the hybrid resin. When such a pre-treatment, anion-exchange resin is used to treat influent water, this resin must also be regenerated. The usual regenerant is a chloride salt solution. The regeneration is more efficient at temperatures above ambient, but it is not a thermal regeneration, and the temperature range most frequently recommended is from about 20° C. to about 50° C.

Chloride anions are present in most waters, and chloride anions are exchanged from the chloride-form pre-treatment resin into the water during sulfate anion removal. These chloride anions are removed from the water by the thermally regenerable resin, and are returned, concentrated, to the regenerant during countercurrent thermal regeneration. The spent thermal regenerant, after cooling to the proper temperature range, is a warm, chloride salt solution, and is therefore well suited to regeneration of the pre-treatment, anion-exchange resin. Thus, the following steps may be added to the dual-zone, thermal-regeneration process detailed above: initially passing the selected volume of water to be treated through a bed of a strongly basic anion exchange resin in the chloride form, to remove sulfate anions; and finally, cooling the spent regenerant effluent from the countercurrent regeneration of the dual-zone, thermally regenerable ion exchange resin, and passing this fluid through the bed of strongly basic anion exchange resin, to regenerate it to the chloride form.

While countercurrent regeneration of the pre-treatment resin is not necessary, the use of countercurrent regenerant flow results in more complete regeneration, with correspondingly less sulfate leakage in subsequent cycles.

A further advantage which results from the use of certain strongly basic anion exchange resins for pre-treating influent water to the thermally regenerable resin bed is that the pH of alkaline waters is adjusted downward toward the optimum pH 5.5 of the thermally regenerable resins used in this invention. Certain naturally occurring waters have alkalinity which produces a pH of up to about 8.5. The resins of this invention operate very efficiently at this pH, and the process benefits greatly from a downward adjustment of such a pH.

The ion exchange resins which are useful in the process of this invention are those thermally regenerable resins which show a greater affinity for divalent cations than for monovalent cations. These resins are so-called "amphoteric" resins which contain both acidic and basic functionality within the same resin bead or particle. These "amphoteric" resins include those in which both acidic and basic functionalities are grafted onto the same polymeric molecule, those in which bits or regions of resin containing one functionality are bound by an inert matrix to bits or regions containing the opposite functionality, those in which the resin bits or regions of opposite functionality are bound together without the use of an inert binder, and those resins in which a gellular resin with one functionality is situated within the pores of a macroreticular resin having the opposite functionality, i.e., hybrid resin. Mixed beds of thermally regenerable resins showing the greater affinity for divalent than for monovalent cations are also operable; these are a mixture of resin particles or beads having acidic functionality with resin particles or beads having basic functionality.

The hybrid ion exchange resins which are useful in the process of this invention are weakly basic—weakly acidic resins prepared by filling a macroreticular, "host" copolymer with a crosslinked, gellular, "guest" copolymer, and functionalizing the resulting heterogeneous polymer structure. This results in the location of one type of ion exchange resin within the pores of another type of ion exchange resin which forms the framework. The individual polymers and their functionalization are well-known, and preparation of the hybrid resins themselves is discussed in U.S. Pat. No. 3,991,017, which is hereby incorporated in this specification by reference.

The anion exchange resins which are useful as countercurrent-regenerable pre-treatment resins in the process of this invention are strongly basic, quaternary ammonium functionalized, gellular anion exchange resins which are well-known in the art. The preparation of the gellular polymers on which these resins are based is taught in U.S. Pat. No. 2,629,710, which is hereby incorporated in this specification by reference.

The following examples illustrate the present invention and compare it to previously known processes; they are not intended to limit the invention except as it is limited in the claims.

EXAMPLE 1

This example demonstrates the selection of the ideal cycle of loading and regeneration for water containing a given concentration of divalent and monovalent cations. In this case the water is a synthetic solution containing 295 parts by weight of sodium chloride and 242 parts by weight of calcium chloride per million parts by weight of water; the pH of the solution is 5.5. The water is passed through a 75-milliliter bed of Resin A at a rate of 8 bed volumes per hour and a temperature of 25° C. The calcium and sodium content of the effluent are determined as a measure of the resin leakage. The following table gives the instantaneous leakage of both sodium chloride and calcium chloride, in parts per million by weight, for 2.5-bed-volume increments of effluents:

| Bed Volumes | $CaCl_2$ ppm | NaCl ppm |
|---|---|---|
| 2.5 | 46 | 121 |
| 5.0 | 40 | 195 |
| 7.5 | 37 | 290 |
| 10.0 | 33 | 325 |
| 12.5 | 30 | 352 |
| 15.0 | 28 | 368 |
| 17.5 | 27 | 383 |
| 20.0 | 29 | 395 |
| 22.5 | 37 | 399 |
| 25.0 | 52 | 392 |
| 27.5 | 81 | 377 |
| 30.0 | 130 | 355 |
| 32.5 | 178 | 342 |
| 35.0 | 211 | 335 |
| 37.5 | 233 | 330 |
| 40.0 | 243 | 328 |

An examination of the above data shows, in addition to the rapid breakthrough of the monovalent cation in the normal, single-zone operation, that the resin is capable of softening about 24 bed volumes of water containing this level of divalent cations.

Based on use of Resin A in the normal, single-zone operation, it is known that the resin can effectively reduce the monovalent cation concentration at this level in about 16 bed volumes of water.

To determine the loading and regeneration cycle for dual-zone use of this resin with this water, assume that the volume of the first, or softening (divalent cation removal) zone is $V_1$, and that of the second, or monovalent-cation-removal zone is $V_2$. The resin will soften 24 bed volumes, or 24 $V_1$, of influent water, and will remove monovalent cations from 16 bed volumes, or 16 $V_2$, of the effluent from the first zone. Since the second zone accepts the entire effluent from the first zone, the total volumes treated by each zone are equal, or 16 $V_2 = 24 V_1$. From this, $V_1 = 0.667 V_2$, and the volume of the entire bed, BV, is $V_2 + V_1$, or 1.667 $V_2$. The volume treated by each zone, when expressed in terms of the entire bed volume, BV, is 16/1.667 BV, or 9.6 BV. The loading, or treatment, cycle is ideally 9.6 bed volumes of influent water, and the regeneration cycle utilizes 25 percent of this, or 2.4 bed volumes, leaving 7.2 bed volumes as product.

Ideal cycles for other waters containing different concentrations of divalent and monovalent cations, may similarly be calculated by experimentally determining the number of bed volumes of a given water which may be softened by the resin, and the number of bed volumes of that water, from which the divalent ions have been removed, which may be treated by the resin to remove monovalent cations.

Resin A, which is used in this and other examples, is a hybrid ion exchange resin, i.e., a resin containing both cationic and anionic functionality which is prepared from a macroreticular, crosslinked polystyrene polymer with a crosslinked acrylic gellular polymer in the pores of the macroreticular polymer. The resin is a weakly acidic—weakly basic ion exchange resin with a cation exchange capacity (weakly acidic functionality) of about 5 to 6 milliequivalents per gram of resin, a total anion exchange capacity (weakly basic plus strongly basic functionality) of about 2 to 3 milliequivalents per gram, and an anion exchange capacity (weakly basic functionality) of about 1.7 to 2.4 milliequivalents per gram. The resin as obtained from commercial suppliers is in the $Na^+$, $Cl^-$ form.

EXAMPLE 2

In this and following examples concentrations expressed as parts per million indicate milligrams of the solute per liter of solution. Milliequivalents are expressed as calcium carbonate regardless of the actual solute; e.g., mg $NaCl/58.45 =$ meq NaCl, equivalent to meq $CaCO_3$. Two similar ion exchange columns are used, and each contains 75 milliliters of Resin A. Column 1 is operated with a countercurrent cycle, i.e., regenerant is passed through the column in a direction opposite that of the water being treated, while column 2 is operated with a cocurrent cycle, with both water being treated and regenerant passing through the column in the same direction. The temperature of the water being treated is monitored at the inlet of the columns (outlet in countercurrent operation) to assure that the treatment temperature during the loading cycle is 25° C., and the temperature during the regeneration cycle is 95° C. The water being treated for removal of divalent and monovalent ions is passed through the columns at 8 bed volumes (600 milliliters) per hour, and 25 percent of the total volume treated is reserved for regeneration, leaving 75 percent of the total volume treated as product. In this example, the total volume treated is 9.6 bed volumes (720 milliliters), and the product volume is 7.2 bed volumes (540 milliliters), after which the last 2.4 bed volumes (180 milliliters) of treated water is heated to 95° C. and is passed through the column at 8 bed volumes (600 milliliters) per hour for regeneration.

The water used in this and following examples is a synthetic water containing 360 milligrams of sodium chloride per liter of water, or 308 ppm NaCl calculated as ppm $CaCO_3$, and 275 milligrams of calcium chloride per liter of water, or 248 ppm $CaCl_2$ calculated as ppm $CaCO_3$. The conductivity of the treated water is measured, and the calcium content is determined by titrating with disodium ethylene-diamine tetraacetic acid. From these data the contents of sodium and calcium chlorides in the treated water are calculated, these are expressed as total dissolved solids reduction, sodium chloride reduction, and calcium chloride reduction. Thermal efficiency of the process, expressed as milliequivalents of calcium carbonate removed from the influent water per British Thermal Unit of heat required to heat the regenerant, is also calculated. The results of this example are shown in the following table:

| | COUNTERCURRENT REGENERATION | | | |
|---|---|---|---|---|
| Cycle | Meq. $CaCl_2$ Removed per ml. of Resin | Meq. NaCl Removed per ml. of Resin | Total Dissolved Solids Reduction, % | Thermal Efficiency Meq./BTU |
| 1 | 0.029 | 0.020 | 61.3 | 0.074 |
| 2 | 0.032 | 0.018 | 62.5 | 0.075 |
| 3 | 0.033 | 0.018 | 63.8 | 0.077 |

-continued

COUNTERCURRENT REGENERATION

| Cycle | Meq. CaCl$_2$ Removed per ml. of Resin | Meq. NaCl Removed per ml. of Resin | Total Dissolved Solids Reduction, % | Thermal Efficiency Meq./BTU |
|---|---|---|---|---|
| 4 | 0.034 | 0.017 | 63.8 | 0.077 |
| 5 | 0.035 | 0.017 | 65.0 | 0.078 |
| 6 | 0.035 | 0.017 | 65.0 | 0.078 |

CO-CURRENT REGENERATION

| Cycle | Meq. CaCl$_2$ Removed per ml. of Resin | Meq. NaCl Removed per ml. of Resin | Total Dissolved Solids Reduction, % | Thermal Efficiency Meq./BTU |
|---|---|---|---|---|
| 1 | 0.031 | 0.022 | 66.3 | 0.080 |
| 2 | 0.028 | 0.017 | 56.3 | 0.068 |
| 3 | 0.020 | 0.015 | 43.8 | 0.053 |
| 4 | 0.021 | 0.016 | 46.3 | 0.056 |
| 5 | 0.021 | 0.012 | 41.3 | 0.050 |
| 6 | 0.019 | 0.014 | 41.3 | 0.050 |

EXAMPLE 3

This example repeats the previous one except that the total volume of water treated is 16 bed volumes (1200 milliliters), of which 12 bed volumes (900 milliliters) is product and 4 bed volumes (300 milliliters) is used for regeneration. This corresponds to the usual cycle employed with Resin A in known processes. The results of this example are given in the following table:

COUNTERCURRENT REGENERATION

| Cycle | Meq. CaCl$_2$ Removed per ml. of Resin | Meq. NaCl Removed per ml. of Resin | Total Dissolved Solids Reduction, % | Thermal Efficiency Meq./BTU |
|---|---|---|---|---|
| 1 | 0.049 | 0.026 | 56.3 | 0.068 |
| 2 | 0.054 | 0.021 | 56.3 | 0.068 |
| 3 | 0.055 | 0.019 | 55.5 | 0.067 |
| 4 | 0.055 | 0.018 | 54.8 | 0.066 |
| 5 | 0.056 | 0.017 | 54.8 | 0.066 |
| 6 | 0.055 | 0.015 | 52.5 | 0.063 |

CO-CURRENT REGENERATION

| Cycle | Meq. CaCl$_2$ Removed per ml. of Resin | Meq. NaCl Removed per ml. of Resin | Total Dissolved Solids Reduction, % | Thermal Efficiency Meq./BTU |
|---|---|---|---|---|
| 1 | 0.052 | 0.012 | 48.0 | 0.058 |
| 2 | 0.040 | 0.013 | 39.8 | 0.048 |
| 3 | 0.035 | 0.017 | 39.0 | 0.047 |
| 4 | 0.034 | 0.014 | 36.0 | 0.043 |
| 5 | 0.033 | 0.016 | 36.8 | 0.044 |
| 6 | 0.035 | 0.016 | 38.3 | 0.046 |

EXAMPLE 4

In this example two similar ion exchange columns are used in series; each contains 400 milliliters of ion exchange resin in a bed approximately 2.7 centimeters in diameter and from 70 to 81 centimeters deep. The first column contains Resin B, a strongly basic anion exchange resin in the chloride form which is prepared from a gellular styrene-divinyl benzene polymer by adding dimethylethanolamine functionality. This resin has a typical anion exchange capacity of about 1.35 milliequivalents per milliliter of wet resin. The second column contains Resin A.

The two ion exchange resin beds are loaded with 10 bed volumes of the fluid being treated, at a temperature of 25° C. and a flow rate of 16 bed volumes per hour. The first six bed volumes of treated effluent are removed as product, while the final four bed volumes are retained for regenerating the resins; this loading and regeneration cycle is selected to utilize the dual-zone process of this invention. To regenerate the resins, the final, 4-bed-volume portion of treated fluid is heated to a temperature of 95° C., and this hot regenerant is passed through the resin beds, at a rate of four bed volumes per hour, in a direction opposite that of the fluid being treated.

The fluid being treated is a water with an initial pH of about 8.5 and with the following concentrations of dissolved solids:

| DISSOLVED ION | CONCENTRATION AS PPM CaCO |
|---|---|
| Ca$^{++}$ | 275 |
| Mg$^{++}$ | 100 |
| Na$^{++}$ | 430 |
| HCO$^-$ | 225 |
| SO$_4$$^=$ | 100 |
| Cl$^-$ | 450 |
| SiO$_2$ | 30 |
| Total Dissolved Solids | 805 |

The pH of this water is measured between the first and second columns, and the pH and total dissolved solids content of the effluent from the second column is determined, after the stated number of loading and regeneration cycles have been run; these data are tabulated below:

| Loading/ Regeneration Cycles Run | pH After First Column | pH After Second Column | Total Dissolved Solids Reduction, % |
|---|---|---|---|
| 80 | 6.2–7.3 | 6.3 | 50 |
| 85 | 6.2–7.4 | 6.3 | 50 |
| 90 | 6.2–7.4 | 6.3 | 50 |

For comparison with the preceeding examples, corresponding data after 5 cycles include a pH after the second column of 5.8, and a total dissolved solids reduction of 85 percent. The only difference between the first 75 cycles and cycles 76 through 90 was the presence of a strongly acidic ion exchange resin column preceding the first column. The total dissolved solids reduction with this additional column in the system was 50 percent from cycle 50 through cycle 75.

We claim:

1. Method of treating an aqueous fluid to substantially reduce the concentration of dissolved salts contained therein, said salts being present in the fluid at a concentration less than about 20 millimoles per liter and containing both divalent and monovalent cations in a mole ratio between about 3:1 and 1:3 of divalent to monovalent cations, which method comprises passing the fluid into and through a bed of a single, thermally regenerable ion exchange resin having a great affinity for divalent than for monovalent cations, the bed having two distinct zones, the useful cation exchange capacity of the freshly regenerated resin in the first zone being essentially in the monovalent ion form and the useful cation exchange capacity of the freshly regenerated resin in the second zone being essentially in the hydrogen form, and the sizes of the zones being (a) calculated based upon the pre-determined content of divalent and monovalent cations in the aqueous fluid and the respective capacities of the resin for these cations, (b) controlled to the sizes calculated in step (a) by controlling the respective volumes of aqueous fluid and regenerant passing through the column during a cycle of aqueous fluid treatment and countercurrent regeneration, and (c) such that the useful cation exchange capacity of the resin in the first zone becomes substantially exhausted by the exchange of monovalent cations from the resin with divalent cations from the fluid at approximately the same time that the useful cation exchange capacity of the resin in the second zone becomes substantially exhausted by the exchange of hydrogen ions from the resins with monovalent cations.

2. The method according to claim 1 wherein, following the substantial exhaustion of the useful cation exchange capacity of the resin bed by the treated fluid, an aqueous regenerant stream at a temperature at least 40° C. higher than the temperature of the influent fluid is passed consecutively through the two zones of the resin bed in a countercurrent direction to regenerate the first and second zones of the resin bed, the regeneration involving the replacement of divalent ions in the exhausted first zone with monovalent ions from the exhausted second zone.

3. Method according to claim 2 wherein the aqueous regenerant stream is a portion of the treated fluid, heated to a temperature suitable for regeneration of the resin bed.

4. Method according to claim 3 wherein the aqueous regenerant stream is about 25 percent of the total volume of the treated fluid.

5. Method according to claim 2 wherein the exhausted second zone contains insufficient monovalent cations to fully regenerate the first zone, and wherein sufficient brine is injected into the resin bed, during regeneration, at approximately the interface of the first and second zones to supply the additional monovalent cations required to regenerate the first zone.

6. Method according to claim 1 wherein the concentration of dissolved salts in the aqueous fluid is at least about one millimole per liter.

7. Method according to claim 1 wherein the fluid additionally contains sulfate anions, and the concentration of said sulfate anions in the fluid is reduced prior to its treatment according to the method of claim 1, by passing it through a pretreatment bed of a strongly basic, quaternary ammonium functionalized, anion exchange resin in the chloride form, and said pretreatment bed of resin is regenerated to the chloride form, with the regenerant effluent from the thermally regenerable ion exchange resin bed.

8. Method according to claim 1 wherein the aqueous fluid additionally contains alkalinity, the concentration of said alkalinity in said fluid is reduced prior to its treatment according to the method of claim 1 by passing it through a pretreatment bed of a strongly basic, quaternary ammonium functionalized, gellular anion exchange resin in the chloride form, and said pretreatment bed of resin is regenerated to the chloride form, following pretreatment of said fluid, by passing through it the spent regenerant effluent from said bed of thermally regenerable resin.

9. Method according to claim 1 wherein the aqueous fluid is a naturally occurring water.

10. Method according to claim 1 wherein said thermally regenerable ion exchange resin is a hybrid resin.

* * * * *